(12) United States Patent
Wang (10) Patent No.: US 6,314,225 B1
(45) Date of Patent: Nov. 6, 2001

(54) HALOGEN AND PERHALO-ORGANO SUBSTITUTED N-PHENYL (OR BIPHENYL) MALEIMIDE

(75) Inventor: Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/448,839

(22) Filed: Nov. 23, 1999

(51) Int. Cl.$^7$ ............................... G02B 6/16; G02B 6/24; C08F 26/06; C08F 226/06; C08F 2/46
(52) U.S. Cl. ...................... 385/123; 385/145; 385/15; 385/143; 385/130; 522/167; 522/181; 522/182; 522/187; 526/248
(58) Field of Search .................................... 522/167, 182, 522/181, 187; 526/242, 243, 245, 247, 248, 251; 385/123, 145, 15, 130, 143

(56) References Cited

U.S. PATENT DOCUMENTS 3,666,720 * 5/1972 Nield et al. .
5,122,613 * 6/1992 Buchanan et al. .

OTHER PUBLICATIONS

Eldada et al., "Sol–Gel and Polymer Photonic Devices", CR68, SPIE Press, 1997.
Hendlinger et al., "Partially Fluorinated Maleimide Copolymers for Langmuir Films of Improved Stability", Langmuir, 13(2), 310–319, 1997.
Dorr et al., "Reactions on Vinyl Isocyanate/Maleimide Copolymers:", Macromolecules, 31(5) 1454–1465 (1998).
Hagiwara et al, Polymerization of N–(2,3,4,5,6–pentafluorophenyl) maleimide), *Macromol. Rapid Chem. Commun*, 18(4), 303–311 (1997).
Mormann et al., "Alternating copolymers from isocyanatoalkenes and electron deficient 1,2–disubstituted alkenes", *Macromol. Chem. Phys.*, 198, 419–429 (1997).
Chung et ano., "Synthesis and Thermal Modification of N–Substituted Functional Polymaleimides", *Macromol. Symp.* 118, 485–491 (1997).
Boldt et al., "Tricyanoquinodimethane–derived chromophores for second–order nonlinear optical polymers", SPIE vol. 2852, 2–11 (1/96).
Liu et al., "Thermal degradation behavior of optically active N–phenyl, N–benzyl, N–diphenylmethyl and N–triphenylmethyl maleimide polymers", *Polymer Degradation and Stability* 61 21–25 (1998).
B. L. Booth, "Polymers for Integrated Optical Waveguides", Polymers for Electronic and Photonic Application, (C.P. Wong, ed.), *Academic Press*, 1993.
J. P. D. Cook, Applied Optics, 37, 1220 (1998).
Y. Hida, et al. IEEE Phot. Techn. Lett., 5, 782 (1993).
M. C. Oh., et al., Applied Physics Letters, 73, 2543 (1998).
A. Matsumoto, et al., Macromolecules 23, 4508 (1990).
El–Guweri et al., Partially Fluorinated Maleimide Copolymer for Langmuir Films of Improved Stability, *Macromol. Chem. Phys.*, 198(2) 401–418 (1997).
T. Kelen, F. Tudos, *J. Macromol. Sci.–Chem.*, A9, 1(1975).
F. R. Mayo and F. M. Lewis, *J. Amer. Chem. Soc.*, 66, 1594 (1944).
S. D. Ross, *J. Polym. Sci.*, 5, 259 (1950).
A. NaGai, A. Takahashi, "Preparation and thermal behavior of fluorine–containing phenylmaleimides" *Polymer Journal*, 26, 357(1994).

\* cited by examiner

*Primary Examiner*—Susan Berman
(74) *Attorney, Agent, or Firm*—Angela N. Nwaneri; Walter M. Douglas (57) ABSTRACT

A copolymer containing N-(halogenated phenyl) maleimide units or N-(halogenated phenyl) bismaleimide units and one or more second units selected from halogenated acrylates, halogenated styrenes, halogenated vinyl ether, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates, is useful to form optical devices

18 Claims, 9 Drawing Sheets

Fig 1 GPC traces of fluorinated maleimide/styrene copolymer from solution copolymerization Fig 2. FTIR spectra of pentafluorophenyl maleimide monomer and polymer Fig. 3 $^{13}$C NMR spectrum of fluorinated maleimide/styrene copolymer (example 1)

Chemical shift (δ ppm)

Fig. 4 Copositional diagram of fluorinated maleimide/styrene copolymerization

Fig. 5 DSC traces of fluorinated maleimide/styrene copolymer by bulk polymerization Fig 6. The relationship between the glass transition temperature and fluorinated maleimide/styrene copolymer composition Fig. 7 Refractive index of fluorinated maleimide/styrene copolyme Fig. 8 The UV/NIR spectrum of maleimide/fluorinated acrylate copolymer Fig. 9 Surface energy of fluorinated maleimide/styrene copolymer

HALOGEN AND PERHALO-ORGANO SUBSTITUTED N-PHENYL (OR BIPHENYL) MALEIMIDE

BACKGROUND OF THE INVENTION

1. Field of the Invention

The present invention relates to copolymers formed from N-(halogenated maleimide) monomers, (also called: "halogen and perhalo-organo substituted N-phenyl(or biphenyl) maleide monomers") and optical materials formed from the copolymers. The invention also relates to methods of making and using such copolymers and materials.

2. Description of Related Art

The micro-electronic and optical industries rely on hundreds of polymeric materials. Polymeric materials currently play an important role, for Example, as coating materials, as photonic devices, as electro-optical devices, and in packaging, such as for optical adhesives.

Passive optical polymers are non-field (electrical, magnetic and optical) response materials. These kinds of material have been used to fabricate various optical circuits for interconnections and switches. For Example, Dupont (B. L. Booth, "Polymers for Integrated Optical Waveguides", Polymers for Electronic and Photonic Application, (C. P. Wong, ed.), Academic Press, 1993) demonstrated a simple manufacture process to produce complicated power splitters and couplers by use of a mixture of acrylate monomers and oligomers. NORTEL (J. P. D. Cook, Applied Optics, 37, 1220 (1998)) fabricated stable polymer waveguides and micromirrors with halogenated acrylates by a UV curing process. NTT (Y. Hida, et al. IEEE Phot. Techn. Lett., 5, 782 (1993)) has shown the possibility of fabricating a thermooptical switching and a Mach-Zehnder interferometer from fluoromethacrylate, with much lower driving voltages and several mili-seconds scale of switching time. ETRIK (M. C. Oh., et al., Applied Physics Letters, 73, 2543 (1998)) described fabrication of a tunable wavelength filter with fiber bragg grating in polymer waveguides of fluorinated poly(arylene ethers).

Passive optical polymer materials, such as optical waveguides and couplers, often require very low optical loss of 0.1 dB/cm to 0.3 dB/cm at 1300 nm and 1550 nm. To reach this requirement is a very challenging objective for polymeric materials, because the key building blocks of polymers are carbon and hydrogen, which have a very strong overtone absorption from the C—H stretch vibration at the near IR region. Therefore, to reach this desired optical loss, materials often need to be halogenated at a very high level, to dilute the C—H bond. For Example, acrylate formulations often need at least 90% fluorination for 1550 nm and at least 55% fluorination for 1300 nm.

Besides the optical transparency, passive optical materials often have to meet very strict thermal (such as low coefficient of thermal expansion (CTE) and desired glass transition temperature (Tg) and mechanical (such as certain strength and flexibility) property requirements. The optical polymers generally also require completely amorphous structures to minimize optical scattering and birefringence.

For a better in-situ microstructure formation in devices and packaging, the monomers used to form the optical polymers are preferred to be ultraviolet (UV) or electron beam (EB) thermal curable in a short time. Fluorinated acrylates have been reported for passive optical devices, such as optical waveguides and couplers. See Eldada et al., "Sol-Gel and Polymer Photonic Devices", CR68, SPIE Press, 1997. A problem of these acrylates is their low glass temperature upon reaching a high degree of fluorination. Also the vinyl addition polymerization of acrylates yields a polymer with at least 3 hydrogens ($CH_2$=CHR) per repeat unit.

There also should be one or two $CH_2$ spacer groups between the acrylate ester oxygen and the fluorocarbon chain to stabilize the ester bond against hydrolysis. Finally, in order to form a process-compatible amorphous polyacrylate, the maximum fluorination from linear fluorinated alcohol is eight $CF_2$ units. Therefore, the structure of acrylates push the minimal optical loss to a higher level due to the overtone absorption of the five to seven CH bonds in each repeat unit. In order to have a 0.1 dB/cm optical loss at 1300 nm, full deuteration to replace the CH group is necessary. See A. Matsumoto, et al., Macromolecules 23, 4508 (1990). This comes with a high cost.

With the increasing fluorination on the side chain ester group, the glass transition temperature of fluorinated acrylate polymers decreases remarkably. Therefore, heavily fluorinated linear acrylate resins have difficulty meeting the 85% RH/85° C. test. This test involves subjecting a waveguide material to 85° C./85% RH conditions as in the standard Bellcore test (GR-1209-CORE, Issue 1, 1994), which is entitled "Generic Requirements for Fiber Optic Branching Components."

El-Guweri et al, "Partially Fluorinated Maleimide Copolymer for Langmuir Films of Improved Stability, Macromol. Chem. Phys., 198(2) 401–418 (1997) and Hendlinger et al., "Partially Fluorinated Maleimide Copolymers for Langmuir Films of Improved Stability", Langmuir, 13(2), 310–319, 1997, describe certain maleimide copolymers for Langmuir films. The fluorinated maleimides were copolymerized with styrene and vinyl ether to prove the concept of enhancement of the thermal stability of LB films. In these papers, two fluorinated vinyl ethers (1-trifluoromethyl-3-(2-vinyloxyethoxy)benzene and 1,2,3,4,5-pentafluoro-6-(2-vinyloxyethoxy)benzene) were used.

Dorr et al., "Reactions on Vinyl Isocyanate/Maleimide Copolymers:", Macromolecules, 31(5) 1454–1465 (1998) describes maleimide copolymers. However, these copolymers are disadvantageous because the fluorinated maleimide/vinyl isocyanate copolymer is not very useful as a waveguide material due to the high optical loss and hydrolysis properties of the hydrocarbon isocyanate group. In Dorr, the isocyanate group is intentionally incorporated into the polymer chain to perform a further attachment reaction with hydroxyl ended chromophores for non-linear optical application.

Hagiwara et al, "Polymerization of N-(2,3,4,5,6-pentafluorophenyl) maleimide), Macromol. Rapid Chem. Commun, 18(4), 303–311 (1997), describes homopolymers of the entitled monomers. Such homopolymers often do not provide the desired optical properties. Moreover the low molecular weight and poor film properties of this homopolymer, mean it can not be favorably used in microstructure manufacturing processes.

SUMMARY OF THE INVENTION

Accordingly, it is an object of the invention to provide polymers useful in, for Example, optical devices that overcome one or more of the deficiencies, such as those discussed above, of currently used polymers.

It is also an object of the invention to provide methods of making and using such polymers.

It is also an object of the invention to provide devices, such as optical devices, that overcome one or more of the deficiencies of current devices.

In accordance with these objectives, there is provided according to the present invention, a copolymer containing halogenated and/or perhalo-organo substituded N-phenyl (or biphenyl) maleimide units and one or more second units selected from the group consisting of halogenated acrylates, halogenated alkynes, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates.

In accordance with these objectives, there is also provided an optical device, formed from a copolymer containing halogenated and/or perhalo-organo substituded N-phenyl (or biphenyl) maleimide units and one or more second units selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates.

Further objects, features, and advantages of the invention will become apparent from the detailed description that follows.

DETAILED DESCRIPTION OF PREFERRED EMBODIMENTS

As used herein, the terms "halogenated N-phenyl maleimide, and perhalo-organo N-phenyl maleimide" or "substituted N-phenyl maleimide" means a maleimide monomer as illustrated by structure (I); and as used herein the term "halogenated N-biphenyl bismaleimide" or "difunctional bismaleimide" means two maleimide monomers linked by a biphenyl group as illustrated by structure (Ia).

As used herein, the terms "halogenated N-phenyl" and "halogenated N-biphenyl" means phenyl or biphenyl moiety in which one or a plurality of the phenyl or biphenyl hydrogen atoms have been replaced by a halogen atom, a perfluoroalkyl group, a perfluoroaryl group or combination thereof.

The present invention provides copolymers formed from a N-halogenated maleimide (N-HMI) monomer. The copolymers can include two or more different types of monomers. Generally, the amounts and ratios of comonomers can be selected to give the desired polymer. Examples of especially useful amounts are discussed below.

Any desired N-HMI monomer can be used. The N-HMI monomer can have the structure (I) where one or both of the two hydrogens can be deuterium.

where:

$R_1$–$R_5$, as illustrated in structure (I), are, independently, H, F, Cl, Br, $CF_3$, a $C_2$–$C_8$ perfluoroalkyl group, a perfluoroaryl group, or any other halogen-containing group, where at least one of $R_1$–$R_5$ is or contains a halogen.

Perfluoro groups are especially useful. Perfluoro groups have all hydrogens replaced with fluorine, but complete perfluorination is not necessary for the R groups. Examples of useful $R_1$–$R_5$ groups include $C_2F_5$, $C_3F_7$, etc. perfluoroalkyl group and $C_6F_5$perfluoroaryl group.

Preferably, at least one of $R_1$–$R_5$ contains fluorine. More preferably, at least one of $R_1$–$R_5$ is fluorine. For Example, 2, 3, 4 or each of $R_1$–$R_5$ is fluorine.

The N-HMI monomer can be formed by techniques known in the art. For Example, the following technique can be used to form a N-HMI monomer:

Instead of or in addition to the maleimide monomer, a difunctional bismaleimide can be used, and can be synthesized by an analogous approach. Useful bismaleimides are represented by the following structure, where the R groups are independently selected from H, F, Cl, Br, $CF_3$, $C_2$–$C_8$ perfluoroalkyl or perfluoroaryl groups, or any other halogen-containing group and at least one R is halogen or a halogenated group.

(Ia)

To make the copolymers of the invention, N-HMI monomer is polymerized with one or more halogenated comonomers. The monomers can be selected to produce a polymer with desired refractive index, for Example, for use in both core and cladding areas in an optical area. For Example, halogenated acrylates, halogenated vinyl ethers, halogenated styrene, halogenated alpha-olefins, halogenated allyls, halogenated propenyl ethers, halogenated methacrylates, halogenated maleates, halogenated itaconates, and/or halogenated crotonates can be used.

If a copolymer is formed, it can include any desired percentage of the halogenated and/or perhalo-organo substituted N-phenyl (or biphenyl) maleimide unit, for Example, from about 1 to about 95%, or 10–90%, or 20–80% by weight, based on the weight of the copolymer.

For Example, the N-HMI can be polymerized with about 5 to about 99%, for Example 30–70% by weight of a halogenated acrylate of the formula II (II)

wherein, $X_1=CH_3$, H, or $CF_3$; $Rf=C_2$–$C_{10}$ linear, branched, or cyclic perfluorocarbon or $CCl_3$, m=0–2, $X_2$=H, F, Cl, or Br.

Any other desired halogenated (meth) acrylate can be used.

The N-HMI can also be polymerized with about 5 to about 99% or about 10 to about 75% by weight of a halogenated styrene of the structure III.

(III)

where, $R_6$–$R_{10}$ are independently H, F, Cl, Br, or $CF_3$
$X_3$=H, $CH_3$, $C_6F_5$, or $CF_3$, where at least one of the groups include a halogen. Any desired halogenated styrenes can be used.

The N-HMI can also be polymerized with, for Example, 5–80 molar percentage or 30–50% halogenated vinyl-ether of the formulate (IV) or, for Example, 5–80 or 20–50 molar percentage of fluorinated olefin of formula (V). Any desired fluorinated olefins can be used.

(IV)

where, p=1 or 2, Rf1=$C_2$–$C_{10}$ linear, branched, or cyclic perfluorocarbon or a halogen. Rf1 also can have the following structure;

where $R_{11}$ is an alkyl group such as methyl or ethyl; Rf2=$C_2$–$C_{10}$ linear, branched, or cyclic perfluoroalkyl group.

(V)

where Rf3=$C_2$–$C_{10}$ linear, branch, or cyclic perfluorocarbon, $X_3$=H, Cl, or F The halogenated vinyl ether useful in the present invention has a halogen group attached directly on the vinyl ether group, rather than on an ethoxy spacer group as in Hendlinger et al. discussed supra.

Other non-halogenated monomers can be used as termonomers. Also, crosslinked copolymers can be produced, for Example, by use of difunctional monomers (I) to (V).

The monomers can be polymerized using any desired polymerization technique. The monomers can be polymerized in organic solvents or supercritical carbon dioxide matrices in the presence of a radical initiator. For Example, N-HMI can be polymerized with fluorinated acrylate using a radical mechanism through UV irradiation or thermal radical initiator in bulk.

The copolymers are useful, for Example, as passive optical devices, and have high thermal stability and low optical loss.

The invention is illustrated by the following Examples. The Examples do not limit the scope of the invention, but are for illustrative purposes only.

A. Preparation of N-pentafluoro maleamide acid

A solution of 98 g (1.0 mol) of maleic anhydride in 150 ml of toluene was warmed to 90° C. on an oil bath. A warm pentafluoro aniline liquid 183g (1 mol) was slowly added with stirring. Reaction occurred at reflux temperature for 24 hours. After cooling to 0° C. in an ice bath, 100 ml of hexane was added to the mass of white crystals. The solution was mixed and filtered, and the obtained solid products washed with a small amount of hexane. 240 g white N-pentafluoromaleamide acid was obtained after collecting the product from solution. The yield was 85%.

B. Preparation of N-pentafluoro maleimide

To 140 g dry N-pentafluoromaleamide acid (0.5 mol) solid in a flask, there was added 20 g sodium acetate as catalyst. This was warmed to 90° C. Then 101 g (1.0 mol) acetic anhydride was added into the flask with stirring. The reaction was kept at 90° C. for 2 hours. The solution was poured into a 1.0 N KOH solution. The slurry-like dark pink product was washed five times with water. The product was dried and dissolved in toluene. The solution was passed through a short silica gel column (5–10 cm) twice to remove the colored side-products. A colorless toluene solution was evaporated and the N-pentafluoromaleimide crystallized at room temperature. The crystals were purified by sublimation under vacuum to obtained 82 g of white needle like crystals and with a yield of 63%, of the N-pentafluoromaleimide.

The following monomers were used in the Examples:

Monomer (I): pentafluorophenyl maleimide (PFPMI)

(I)

Comonomer (II); 1H, 1H, 2H, 2H heptadecafluoro-decyl acrylate (II)

Comonomer (III); pentafluoro styrene

Comonomer (IV)-a; 2-chloroethyl vinyl ether (IV)-a

Comonomer (IV)-b; N-methyl, fluorinated sulfonamide vinyl ether (IV)-b

Comonomer (IV)-c; N-ethyl, fluorinated sulfonamide vinyl ether (IV)-c

Comonomer (V) 1H, 1H, 2H, heptadecafluoro decene-1

(V)

Monomers (II) and (III) are commercially available and were purified by running through a silica gel column to remove the inhibitors. Comonomer (IV)-a, (IV)-b, (IV)-c, and (V) were used as received from the commercial source. Monomer (I) was synthesized as described above.

Solution Copolymerization

EXAMPLE 1

In a 100 ml flask, 12.5 mmol (3.29 g) PFPMI (monomer I), 37.5 mmol (7.28 g) pentafluoro styrene (III) and 0.5 mmol (82 mg) 1 mol % 2,2-azoisobutyronitrile (AIBN) were dissolved in 25 ml α,α,α-trifluoromethyl toluene with a stirring bar. The reaction mixture was slowly bubbled by nitrogen for five minutes to get rid of dissolved oxygen. The flask was placed into a 90° C. oil bath for four hours. The solution was poured into a hexane solution. The precipitated solid polymer was collected by suction filtration. The polymer was washed with hexane/ethanol at a 1:1 vol./vol. ratio and dried in a vacuum oven at 60° C. overnight, resulting in a yield of 7.8 g copolymer.

EXAMPLE 2

Same as Example 1, but the monomer/comonomer molar feed ratio was changed to 1:1, e.g., 25 mmol (6.58 g) PFPMI 25 mmol (4.85 g) mixed with 25 mmol of pentafluorostyrene.

EXAMPLE 3

Same as Example 1, but the monomer feed ratio was changed to 3:1, e.g., 37.5 mmol (9.86 g) pentafluorophenyl maleimide 12.5 mmol (4.85 g) mixed with 25 mmol of pentafluoro styrene.

EXAMPLE 4

In a degassed flask, 19.0 mmol (5.0 g) of PFPMI and 9.65 mmol (5 g) of 1H, 1H, 2H, 2H heptadecafluoro-decyl acrylate (comonomer (II)) were dissolved in 10 ml α,α,α-trifluoromethyl toluene under a nitrogen atmosphere. Then, 30 mg radical initiator AIBN was added to the monomer solution. The polymerization was carried out at 65° C. for 16 hours. The solution was poured into a hexane solution. The precipitated solid polymer was collected by suction filtration, and washed with a hexane/methanol solution resulting in a yield of 7.2 g of copolymer.

Bulk Copolymerization

EXAMPLE 5

To a degassed glass vial, 6.25 mmol (1.65 g) of PFPMI (I) and 18.75 mmol (3.64 g) of pentafluorostyrene (monomer III) were mixed with 30 mg of 2,5-dimethyl-2,5-di(tert-butylperoxy)hexane as an initiator. The mixture was heated to 140° C., and the crystal maleimide started to dissolve in the pentafluorostyrene. The liquid monomer was polymerized to form a hot solid polymer within 30 minutes. The polymer was dissolved in 20 ml of hot toluene at 80° C. and precipitated in 300 ml of hexane. The polymer was washed with a hexane/ethanol solution at a 1:1 (vol./vol.) ratio and dried in a vacuum oven at 50° C. over night.

EXAMPLE 6

Same as Example 5, but the monomer/comonomer molar feed ratio was changed to 1:1, e.g., 12.5 mmol (3.29 g) PFPMI mixed with 12.5 mmol (2.43 g) of pentafluorostyrene.

EXAMPLE 7

Same as Example 5, but the monomer feeding ratio was changed to 3:1, e.g., 18.75 mmol (4.93 g) PFPMI mixed with 6.25 mmol (1.21 g) of pentafluorostyrene.

EXAMPLE 8

To a degassed glass vial, 3 g of PFPMI (I) and 3 g of 1H, 1H, 2H, 2H heptadecafluoro-decyl acrylate (comonomer (II)) were placed with 30 mg of 2,5-dimethyl-2,5-di(tert-butylperoxy)hexane as an initiator. The mixture was heated to 140° C., and the crystal maleimide started to dissolve in the acrylate. The liquid monomer polymerized and formed a solid polymer within 30 minutes. The polymer was dissolved in hot α,α,α-trifluoromethyl toluene and precipitated in hexane. The polymer powder was washed with a hexane/ethanol solution and dried in a vacuum oven at 50° C. over night.

EXAMPLE 9

To a degassed glass vial, 3 g (11.4 mmol) of PFPMI (I) and 3 g (28.4 mmol) of 2-chloroethyl vinyl ether (comonomer (IV)-a) were mixed with 30 mg of 2,5-di(tert-butylperoxy)hexane as an initiator. The mixture was heated to 140° C. The liquid monomer polymerized to form a viscous polymer within 30 minutes. The polymer was dissolved in 20 ml of hot toluene at 80° C. and precipitated in 300 ml of hexane. The polymer was washed with a hexane/ethanol solution having a 1:1 (vol./vol.) ratio and dried in a vacuum oven at 50° C. over night.

EXAMPLE 10

The same polymerization conditions as Example 9 were used, except 3 g (11.4 mol) of PFPMI and 3 g (5.37 mol) of N-methyl sulfonamide vinyl ether (comonomer (IV)-b) were used as monomers.

EXAMPLE 11

The same polymerization conditions as Example 9 were used, except 3 g (11.4 mol) of PFPMI and 3 g (5.36 mol) of N-ethyl sulfonamide vinyl ether (comonomer (IV)-c) were used as monomers.

EXAMPLE 12

To a degassed glass vial, 3 g (11.4 mmol) of PFPMI (I) and 3 g (18.1 mmol) of 1H, 1H, 2H-heptadecafluorodecene-1 were mixed with 30 mg of 2,5-dimethyl-2,5-di(tert-butylperoxy)hexane as an initiator. The mixture was heated to 150° C. The liquid monomer polymerized to form a viscous polymer within 12 hours. The polymer was dissolved in 20 ml of hot toluene and precipitated in 300 ml of hexane. The polymer was washed with hexane/ethanol 1:1 and then the polymer powder was dried in a vacuum oven at 50° C. over night Comparison Examples
Preparation of Homopolymers

EXAMPLE 13

Under the same conditions as Example 5, the PFPMI (I) was polymerized to form a solid homopolymer.

EXAMPLE 14

Under the same conditions as Example 2, homopolymerization of pentafluorostyrene was carried out in solution. Sample was collected as reference.

The polymers prepared in the Example were evaluated as follows:

Polymer Characterization

The molecular weight and molecular weight distribution was determined by gel-permeation chromatography (GPC, Waters HPLC 5050 Column) with tetrahydrofuran as the solvent. Polystyrene standards were used as a reference to estimate the molecular weight. The molecular structure, including chain conformation, copolymer composition and sequence distribution was confirmed by FTIR, and NMR spectrometer (Varian 400). The composition was calculated from the average values of $^1H$, $^{13}C$, $^{19}F$ NMR spectra. To minimize the nuclear overhause effect, long relaxation time (30 second) was used to measure the $^{13}C$ spectra for better quantitative information. $^1H$—$^{19}F$ decoupling was also used in $^{13}C$ NMR measurements to simplify the spectra. The copolymerization reactivity ratios ($r_1$, for maleimide, $r_2$ for comonomer) were calculated from the Kelen-Tudos method (T. Kelen, F. Tudos, J. *Macromol. Sci. -Chem.*, A9, 1(1975)) at high (90%) conversion. The copolymer sequence distribution was derived from the probability function. Thermal properties were evaluated by differential scanning calorimeter (DSC, Mettler 90) and thermal gravity analysis (TGA) at a heating rate of 20° C./min under air. Optical loss was measured by transmission spectra from a UV-NIR spectrometer (Perkin-Elmer 9000). The refractive indices at 1300 and 1541 nm were determined from the Metricon 2010 prism coupler. The surface tension of the copolymer film was measured by contact angle data of three different known surface tension solvents and calculated from mean field theory.

Results and Discussions
Polymerization

The polymerization results are summarized in Table 1. FITIR and NMR spectra confirmed the formation of copolymer structure in all the Examples. The copolymerization yield is related to both monomer feeding ratio and polymerization conditions. Normally, solution copolymerization (Examples 1–3) has a relatively low yield compared to the bulk copolymerization (Examples 5–7).

TABLE 1

(Co)polymerization, Structure and Properties of Maleimide (Co)polymers

| Example Number-Comon. | Monomer Comp. | | Polymer Comp. | | Molecular Wt. | | Thermal Property | |
|---|---|---|---|---|---|---|---|---|
| | PFPMI (mol %) | Comon. (mol %) | PFPMI (mol %) | Comon (mol %) | $M_n$ (×10³) | $M_w/M_n$ | $T_g$(° C.) | $T_d$(° C.) |
| 1-(III) | 25 | 75 | 19 | 81 | 16.8 | 2.06 | 126 | >320 |
| 2-(III) | 50 | 50 | 36 | 64 | 18.9 | 1.73 | 130 | >320 |
| 3-(III) | 75 | 25 | 47 | 53 | 20.8 | 2.36 | 135 | >320 |
| 4-(II) | 66 | 34 | 62 | 38 | — | — | 155 | |
| 5-(III) | 25 | 75 | 25 | 75 | 21.5 | 3.74 | 151 | >320 |
| 6-(III) | 50 | 50 | 54 | 46 | 32.8 | 3.24 | 163 | >320 |
| 7-(III) | 75 | 25 | 83 | 17 | 24.9 | 8.19 | 184 | >320 |
| 8-(II) | 66 | 34 | 72 | 28 | — | — | 168 | 320 |
| 9-(IV)a | 29 | 71 | 49 | 51 | 10.4 | 7.7 | 151 | 295 |
| 10-(IV)b | 68 | 32 | 84 | 16 | 2.5 | 2.11 | 133 | 271 |
| 11-(IV)c | 68 | 32 | 73 | 27 | 3.0 | 2.74 | 99 | 231 |
| 12-(V) | 63 | 37 | 80 | 20 | — | — | — | — |
| 13 | 100 | 0 | 100 | 0 | 9.1 | 14.8 | 268 | — |
| 14-(III) | 0 | 100 | 0 | 100 | 9.9 | 2.18 | 108 | — |

The copolymerization reactivity ratios, $r_1$, and $r_2$, for maleimide and comonomer pairs are, respectively, the rate constants of four different chain propagation reactions:

$$\sim M_1^* + M_1 \longrightarrow \sim M_1M_1^* \quad k_{11}$$

$$\sim M_1^* + M_2 \longrightarrow \sim M_1M_2^* \quad k_{12}$$

$$\sim M_2^* + M_1 \longrightarrow \sim M_2M_1^* \quad k_{21}$$

$$\sim M_2^* + M_2 \longrightarrow \sim M_2M_2^* \quad k_{22}$$

According to the definition, $r_1 = k_{11}/k_{12}$, $r_2 = k_{22}/k_{21}$, the relationship between the composition of the initially formed copolymer and the initial monomer mixture can be written as;

$$\frac{dm_1}{dm_2} = \frac{M_1(r_1M_1 + M_2)}{M_2(r_2M_2 + M_1)} \quad (1)$$

The above equation can be simplified to $dm_1 = m_1$, $dm_2 = m_2$ at low conversion (less than 20%) which is known as the Lewis-Mayo (F. R. Mayo and F. M. Lewis. *J. Amer. Chem. Soc.*, 66, 1594 (1944); M. Fineman and, S. D. Ross, *J. Polym. Sci.*, 5, 259 (1950)) equation. For high conversion, the Kelen-Tudos method is more accurate to describe the copolymerization. The copolymerization reactivity ratios of PFPMI with pentafluoro styrene were calculated from the plotting method and are summarized in Table 2. The bulk copolymerizations at 140° C. have close $r_1$ and $r_2$ ($r_1=2.0$, $r_2=1.4$) values. However, in solution copolymerization at 90° C. in α,α,α-trifluoromethyl toluene, $r_1$, is much smaller than $r_2$ ($r_1=0.13$, $r_2=0.98$). Therefore, at a high PFPMI feeding ratio (Example 4), the pentafluorostyrene comonomer is fully converted to polymer. Meanwhile, there is still a larger amount of PFPMI left because of its low reactivity, giving rise to a lower yield.

TABLE 2

Copolymerization Reactivity Ratios of PFPMI/pentafluorostyrene Copolymerization

| Polymerization method | Temperature (° C.) | $r_1$ (maleimide) | $r_2$ (styrene) | $r_1 * r_2$ |
|---|---|---|---|---|
| Solution | 90 | 0.13 | 0.98 | 0.13 |
| Bulk | 140 | 2.0 | 1.4 | 2.8 |

The copolymers prepared have a molecular weight from solution copolymerization that is lower than that of corresponding bulk copolymerizations because of the chain transfer reaction with solvent and relatively high concentration of initiator. Under the same polymerization conditions, the average copolymer molecular weight of copolymers is higher than the homopolymers. Molecular weight distribution from solution copolymerization is 2–2.5 which is close to ideal radical copolymerization.

Figure 1:
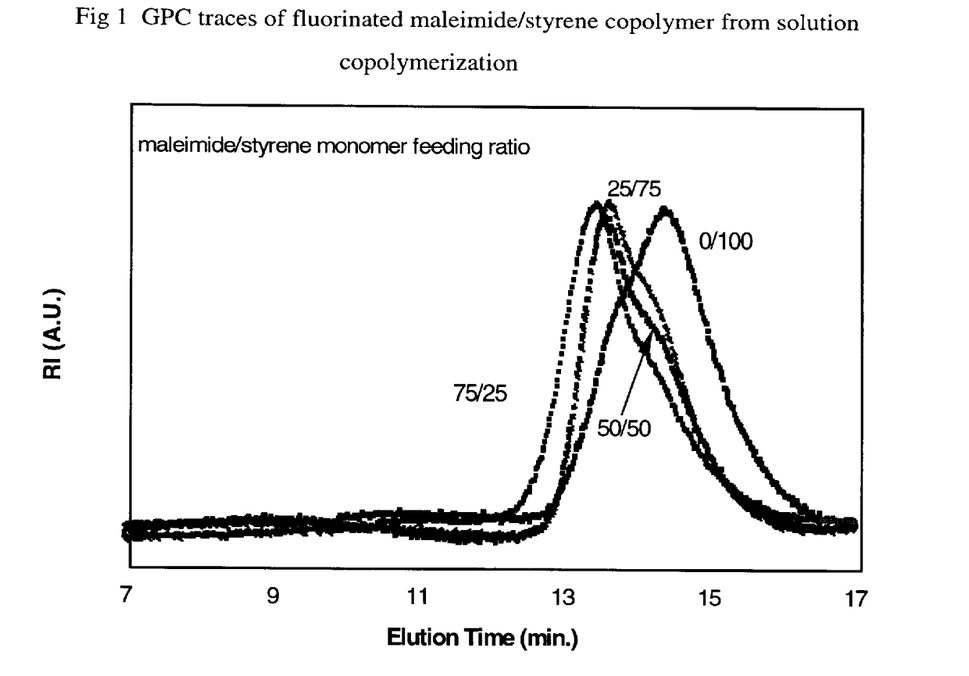
FIG. 1 is a graph of GPC traces of a copolymer according to the invention.

FIG. 1 shows the GPC traces of fluorinated maleimide/styrene copolymers from solution copolymerization. A small shoulder at low molecular weight fractions in the GPC curves (FIG. 1) may relate to the different chain propagation rates of different local conformations (scheme 1). The bulk copolymerization has a much broader molecular weight distribution Mw/Mn=2–8. From Examples 5 to 7, the polydispersity of the copolymer increases with incorporating more maleimide unit. As seen from the DSC results in Table 1, the broadening molecular weight distribution is attributed to the high glass transition temperature (Tg) of the formed copolymer. When the reaction temperature is lower than that of the Tg of the formed copolymer, the reaction at the end stage becomes diffusion controlled which results in a very broad molecular weight distribution.

Polymer Structure

The copolymer chain structure is dominated by the polymerization mechanism and kinetics.

Figure 2:
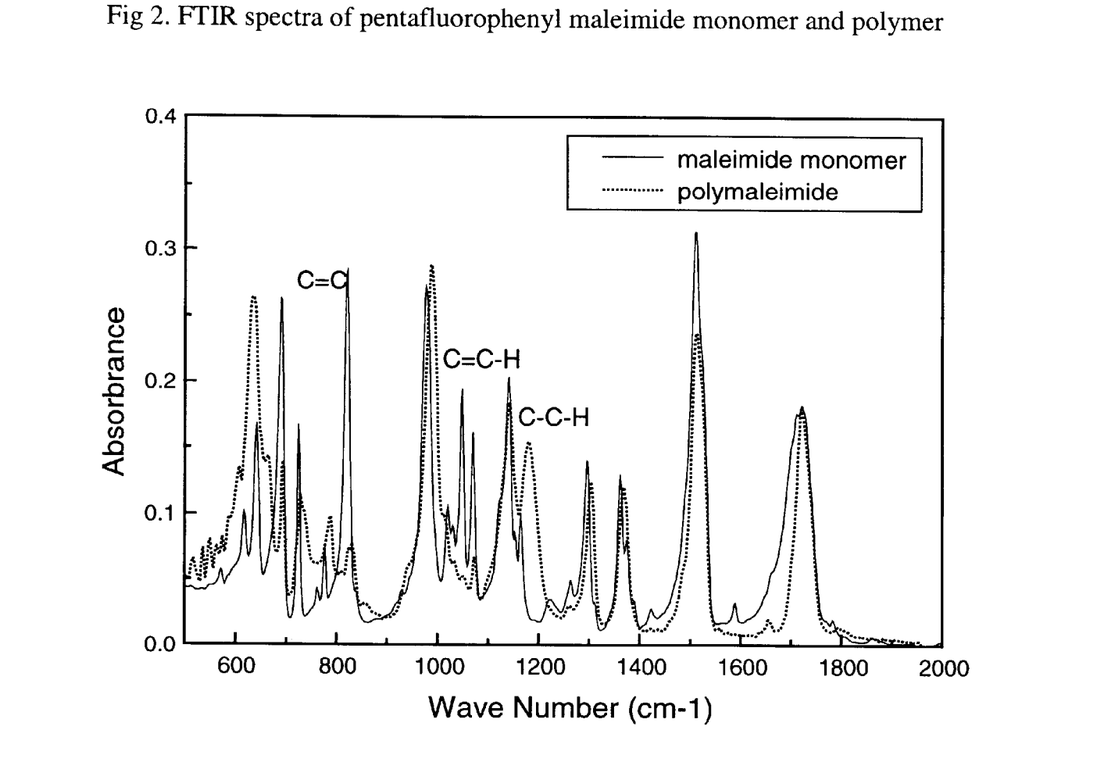
FIG. 2 is a graph of FTIR spectra of a maleimide monomer and polymer according to the invention.

Comparing the FTIR spectra (FIG. 2) of maleimide monomer and polymer, there is found a distinct disappearance of carbon double bonds (695 cm⁻¹, 825 cm⁻¹) and formation of the saturated C—C polymer backbone at 1180 cm⁻¹. Because the polymaleimide is an amorphous material, the C=O stretch peaks at 1720 cm⁻¹ in the polymaleimide appears much narrower in contrast to crystalline maleimide monomer.

The composition of the copolymers was determined by the NMR spectra. Typically, the peaks in 1H NMR spectra are strongly broadened. The assignment substituted carbon or fluorine (schematic 1) in the copolymer is listed in Table 3. From the polymerization mechanism, both trans and cis-substituted succinimide rings in the copolymer are possible.

Scheme 1 The trans and cis-substituted succinimide ring structure in the copolymer From $^{19}$F NMR spectra, it is clear that the p-F(1) from the maleimide is well separated from the other fluorine groups. The relaxation time between different fluorines on the same phenyl ring is considerably small so that the composition can be determined from $^{19}$F NMR (Table 3).

TABLE 3

$^{19}$F NMR Assignment of Fluorinated Maleimide/Styrene Copolymer

| F position | p-F(1) | m-F(2) | o-F(3) | p-F1 | m-F2 | o-F3 |
|---|---|---|---|---|---|---|
| δ(ppm) | −151.1* | −141 | −159.9 | −154.7 | −164.6 | −144.4 |

*Chemical shift (δ) is referred to CCl$_3$F.

Figure 3:
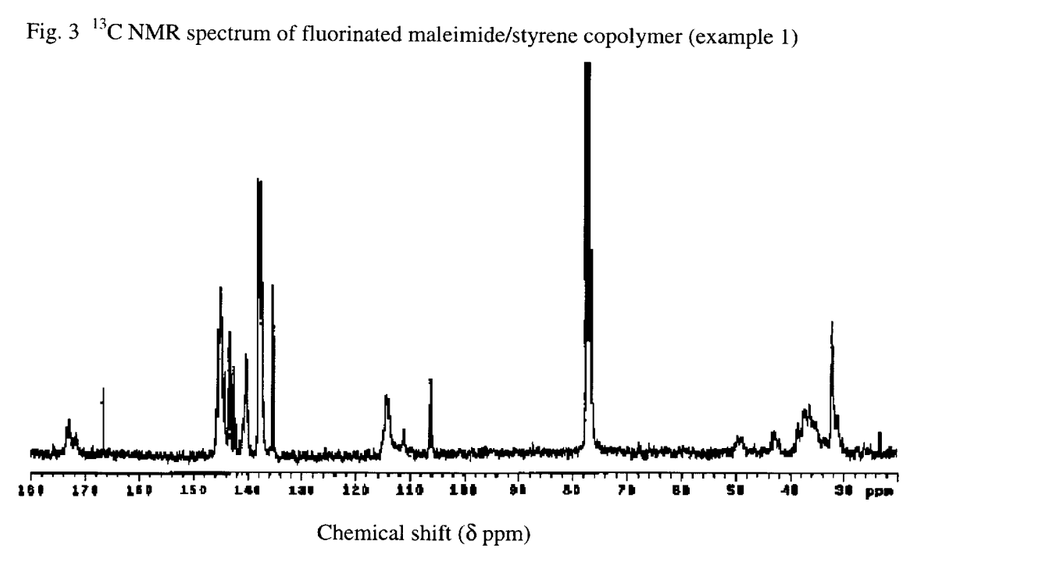
FIG. 3 is a graph of 13C NMR spectrum of a copolymer according to the invention.

The $^{13}$C NMR spectra has been widely used to determine the sequence distribution and local confirmation because of its high sensitivity. A typical $^1$H/$^{19}$F decoupling $^{13}$C NMR spectra of copolymer is shown in FIG. 3. The assignment of each carbon is listed in Table 4.

TABLE 4

The $^{13}$C NMR Assignment of Fluorinated Maleimide/Styrene Copolymer

| Carbon | Example 1 | Example 2 | Example 3 |
|---|---|---|---|
| C(1) | 142.6* | 142.6 | 142.6 |
| C(2) | 138.0 | 138.0 | 138.0 |
| C(3) | 143.6 | 143.3 | 143.3 |
| C(4) | 106.1 | 106.0 | 106.0 |
| C(5) | 175.8, 173.0, 171.6 | 172.8, 171.3 | 172.9, 172.1, 171.5 |
| C(6) | 49.7 | 48.5 | 49.0 |
| C(6)* | 43.1 | 42.9 | 42.8 |

TABLE 4-continued

The $^{13}$C NMR Assignment of Fluorinated Maleimide/Styrene Copolymer

| Carbon | Example 1 | Example 2 | Example 3 |
|---|---|---|---|
| C1 | 140.3 | 141.3 | 141.2 |
| C2 | 137.5 | 138.0 | 138.0 |
| C3 | 145.0 | 145.3 | 145.4 |
| C4 | 114.1,111.1 | 113.2,111.1 | 112.0,111.1 |
| C5 | 38.7, 37.3, 36.4 | 35.3 | 36.2, 35.3, 34.7 |
| C6 | 32.1 | 33.7 | 33.7 |

*Chemical shift is referred to TMS

Figure 4:
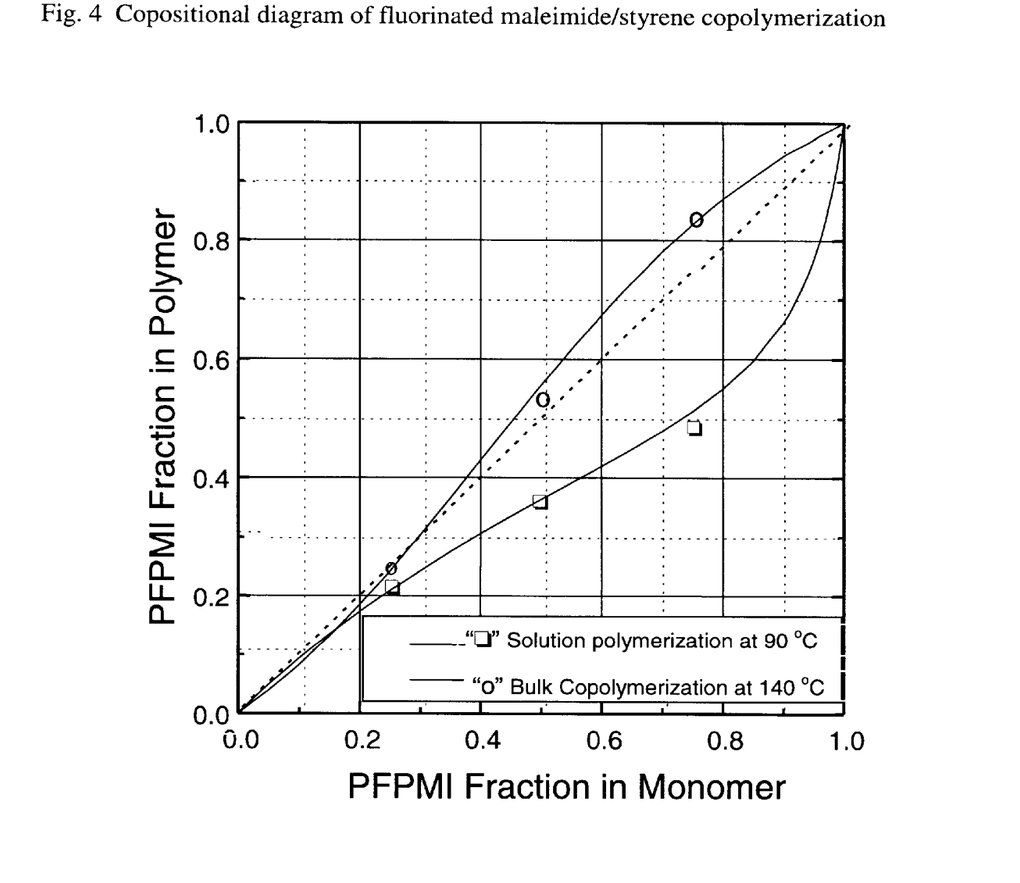
FIG. 4 is a graph of a compositional graph of a copolymer according to the invention.

The multiple carbonyl signals in maleimide units and methylene groups from styrene reveal the conformational interactions between these two units. From the different monomer feeding ratio (M) and copolymer composition (m), the copolymerization reactivity ratios can be calculated from the Kelen-Tudos method (assuming the conversion is 90%). Using the reactivity ratios, the copolymerization compositional diagram based on the Lewis-Mayo method (FIG. 4) can be calculated. Under the same monomer and comonomer feed ratio, the copolymers have different compositions because of different copolymerization reactivity ratios. This compositional diagram can assist in controlling final properties such as refractive index, optical loss, and thermal stability through changing monomer feed ratio. For Example, formation of single mode polymer waveguides often requires the refractive index difference between core and cladding to be less than 0.20±0.02%, which is equivalent to a compositional control of ±1-5% mol depending on the refractive index between the monomer and comonomer.

The high temperature bulk copolymerization can incorporate more maleimide units because the $k_{11}$ is strongly dependent on the electronic properties of the substitute groups. The theoretical calculated energy difference (See A. NaGai, A. Takahashi, "Preparation and thermal behavior of fluorine-containing penylmaleimides" Polymer Journal, 26, 357(1994)) between the HOMO and LUMO orbits on the PFPMI double bond is as high as 8.03 ev which is attributed to the strong electron withdrawing fluorine groups on the phenyl ring. The activation energy of the thermal (radical) polymerization is approximately related to the bond dissociation energy as well as to the stabilization energy of the double bond. Thus, the $K_{11}$ is so small at low reaction temperatures that PFPMI can not be homopolymerized. On the other hand, $K_{11}$ is very sensitive to the temperature because of the high activation energy ΔE. According to the Arrenius equation ($K_{11}=A^*e^{(-\Delta E/kT)}$), the polymerization rate constant will increase significantly at higher reaction temperatures as bulk polymerization conditions rise to 140° C.

As interpreted from the value of $r_1{}^*r_2=0.13$, the sequence distribution of the solution copolymer is close to an alternating copolymer ($r_1{}^*r_2\sim 0$). However, the bulk copolymerization gives rise to a slight block sequence distribution ($r_1{}^*r_2=2.8>1$). Based on the $r_1$ and $r_2$ data, the sequence distribution of the block copolymer (1:1 feeding ratio) was calculated by using the probability function ($P_{11}$, $P_{12}$, $P_{21}$, $P_{22}$) as follows. The random distributions where, $m_1=P_{11}$ and $m_2=P_{22}$ were also simulated for comparison (Table 5)

$$P_{12} = 1 - P_{11} = \frac{2m_1}{1 + \sqrt{(1 + 4(r_1 * r_2 - 1)m_1 m_2}} \qquad (2)$$

-continued $$P_{21} = 1 - P_{22} = \frac{2m_2}{1 + \sqrt{(1 + 4(r_1 * r_2 - 1)m_1 m_2}} \quad (3)$$

$$[m_1 m_1] = m_1 * P_{11} \quad (4)$$

$$[m_1 m_2] = m_1 * P_{12} + m_2 * P_{21} \quad (5)$$

$$[m_2 m_2] = m_2 * P_2 \quad (6)$$

TABLE 5

The Diad Sequence Distribution from $r_1 * r_2$ and Random Distribution

| Sequence distribution | $[m_1 m_1]$ | $[m_1 m_2]$ | $[m_2 m_2]$ |
|---|---|---|---|
| Example 2 | 0.04 | 0.64 | 0.32 |
| Random Distribution | 0.13 | 0.46 | 0.41 |
| Example 5 | 0.32 | 0.37 | 0.30 |
| Random Distribution | 0.29 | 0.50 | 0.21 |

'$m_1$' represents pentafluorophenyl maleimide (PFPMI)
'$m_2$' represents pentafluoro styrene From Table 5, the alternative distribution from solution copolymerization (Example 2) has a higher $[m_1 m_2]$ concentration in comparison with the random distribution, while the block distribution has higher $[m_1 m_1]$ and $[m_2 m_2]$ concentrations.

Polymer Properties
Thermal Properties

Figure 5:
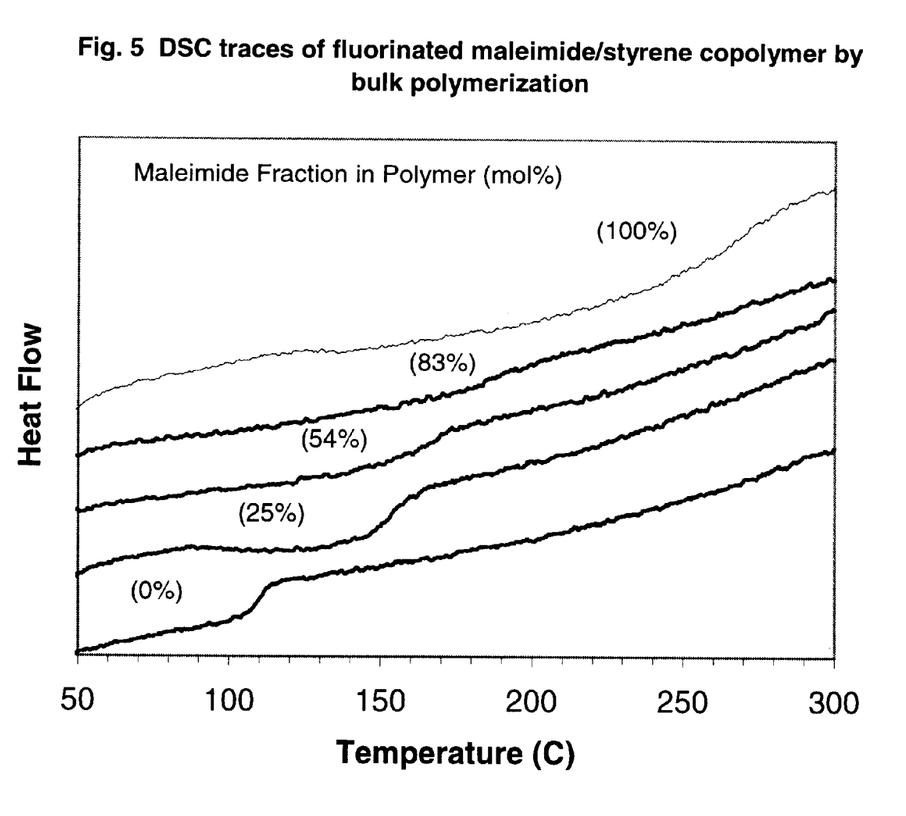
FIG. 5 is a graph of DSC traces of a copolymer according to the invention.

All of the copolymer samples of the Examples are amorphous as none of the first order transitions (phase transition) have been detected from DSC traces, only a second order transition (glass transition). See FIG. 5. The maleimide copolymers showed a remarkable enhancement of Tg over a homopolymer from comonomer (II) to (IV). For example, the maleimide/fluorinated acrylate copolymer (Example 4) has a Tg of 155° C. which is more than 150° C. higher than that of the poly(1H, 1H, 2H, 2H, heptadecafluorodecyl acrylate) homopolymer. The alternative maleimide/2-chloroethyl vinyl ether copolymer (Example 9) has a Tg of 151° C., at least 120° C. higher than the 2-chloroethyl vinyl ether homopolymer.

Figure 6:
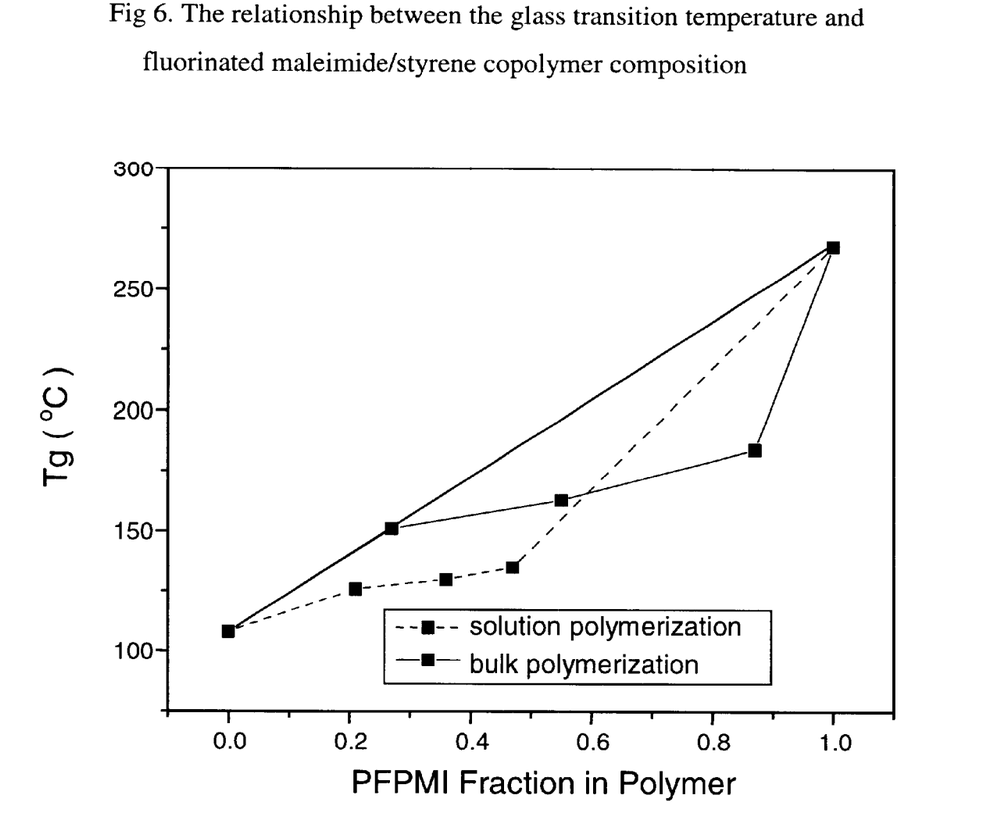
FIG. 6 is a graph of the relationship between Tg and composition of copolymers according to the invention.

Within the series of pentafluorostyrene samples (FIG. 6), the Tg increases with the increase in the content of maleimide units in the copolymer. The highest Tg of the copolymer is 184° C. However, both solution polymerization and bulk polymerization copolymer samples exhibited a lower Tg than expected from a random copolymer because the sequence distribution is alternating or block. In FIG. 6, the solid straight line represents the Tg of the ideal random copolymer.

The thermal stability of the copolymers is strongly dependent on the copolymer structure. See Table 1. The acrylate and styrene copolymers decompose at 320° C. in an air environment. The vinyl ether copolymers start to lose weight at lower temperatures around 230° C.–290° C. based on TGA analysis. For the similar fluoro sulfonamidevinyl ether (IV) copolymer, N-methyl sulfonamide vinyl ether is more stable ($Td_d$=271° C.) than that of N-ethyl sulfonamide vinyl ether ($T_d$=231° C.). Therefore, both polar groups and long alkyl chains reduce the thermal stability of a copolymer.

Optical Properties

Refractive index match to the single mode optical fiber at near IR region is desirable for producing optical devices. The ideal refractive index of core material is between 1.44–1.45 at 1330 and 1550 nm. One of the advantages of the maleimide copolymer is the relatively higher refractive index of homopolymaleimide (RI=1.492 @ 1300 nm) due to the phenyl ring and two carbonyl groups. See Table 6. This means that much more fluorocarbon comonomer (low refractive index comonomer) could be incorporated and still match the refractive index.

Figure 7:
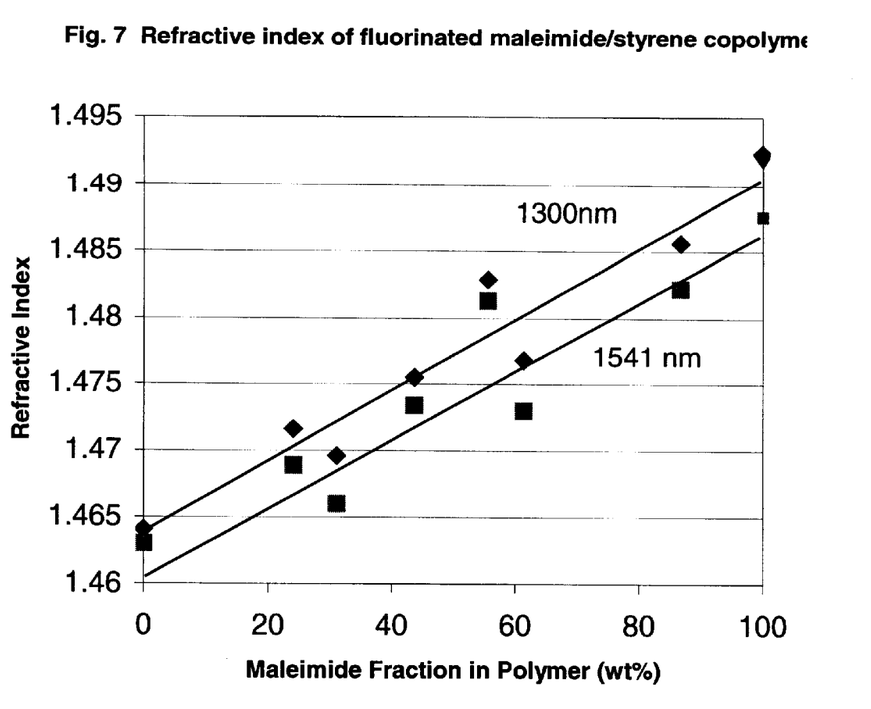
FIG. 7 is a graph of the refractive index of copolymers according to the invention.

The refractive index of the fluorinated maleimide/styrene copolymer (FIG. 7) vs. weight (~ volume) composition is linearly dependent. Therefore, copolymerizing of the N-halogenated aryl maleimide with a highly fluorinated, low refractive index comonomer (RI=1.35–1.40) could adjust the refractive index in a very broad region.

TABLE 6

The Refractive Index of Fluorinated Maleimide/Styrene Copolymer

| Example Number-Comonomer | Composition (PFMI wt %) | Refractive Index @ 1300 nm | Refractive Index @ 1541 nm |
|---|---|---|---|
| 1-(III) | 24.1 | $1.47_{16}$ | $1.46_{89}$ |
| 2-(III) | 43.3 | $1.47_{55}$ | $1.47_{14}$ |
| 3-(III) | 55.6 | $1.48_{29}$ | $1.48_{13}$ |
| 5-(III) | 31.1 | $1.46_{96}$ | $1.46_{60}$ |
| 6-(III) | 61.4 | $1.47_{68}$ | $1.47_{30}$ |
| 7-(III) | 86.7 | $1.48_{56}$ | $1.48_{22}$ |
| 13 | 100 | $1.49_{22}$ | $1.48_{76}$ |
| 14-(III) | 0 | $1.46_{41}$ | $1.46_{30}$ |

Figure 8:
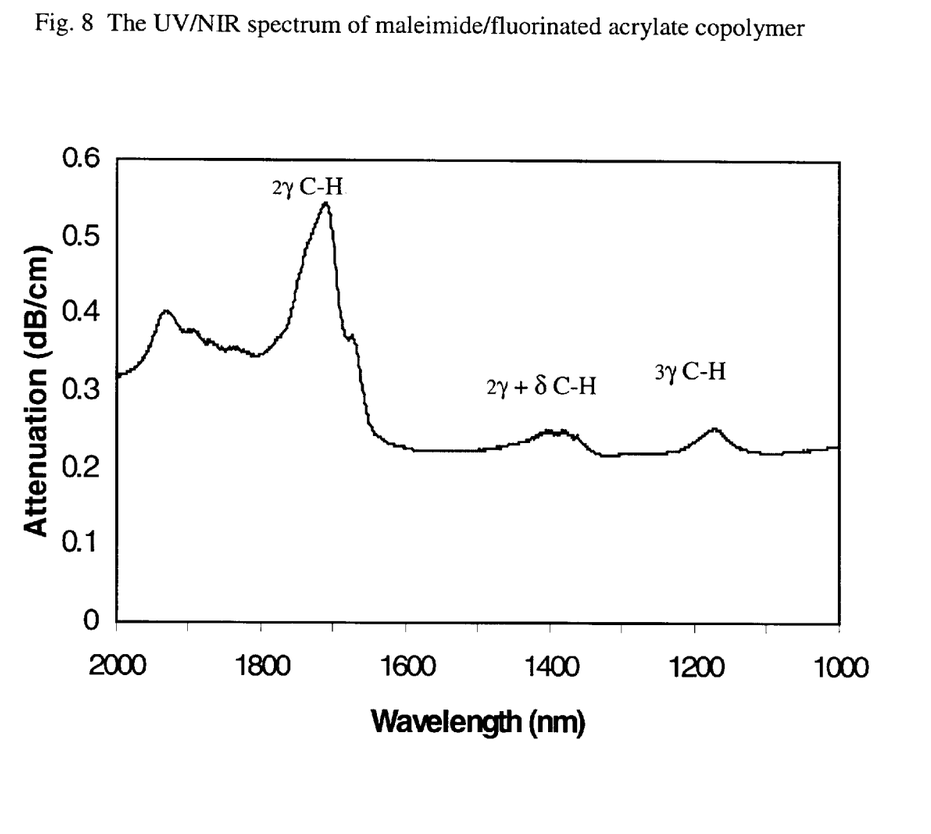
FIG. 8 is a graph of the UV/NIR spectrum of copolymers according to the invention.

The optical transmission spectrum and its assignment of Example 4 is shown in FIG. 8. The optical loss of this sample is obtained by quantitatively subtracting the reflection loss from air-polymer surface. The experimental optical loss of Example 4 is 0.23 dB/cm at 1550 nm and 0.2 dB/cm at 1300 nm. This optical loss value is lower than many fluorinated acrylates. The theoretical intrinsic loss of this material should be 0.11 dB/cm at 1550 nm.

Surface Property

The surface property is one of the process parameters that is especially important for the polymer microstructure formation process. In principle, the lower the polymer surface tension is, the smaller the interaction (adhesion) between the polymer and the mold surface will be. The minimal feature size can be achieved through a contact micro-replication process only under the smallest polymer/mold interaction.

Figure 9:
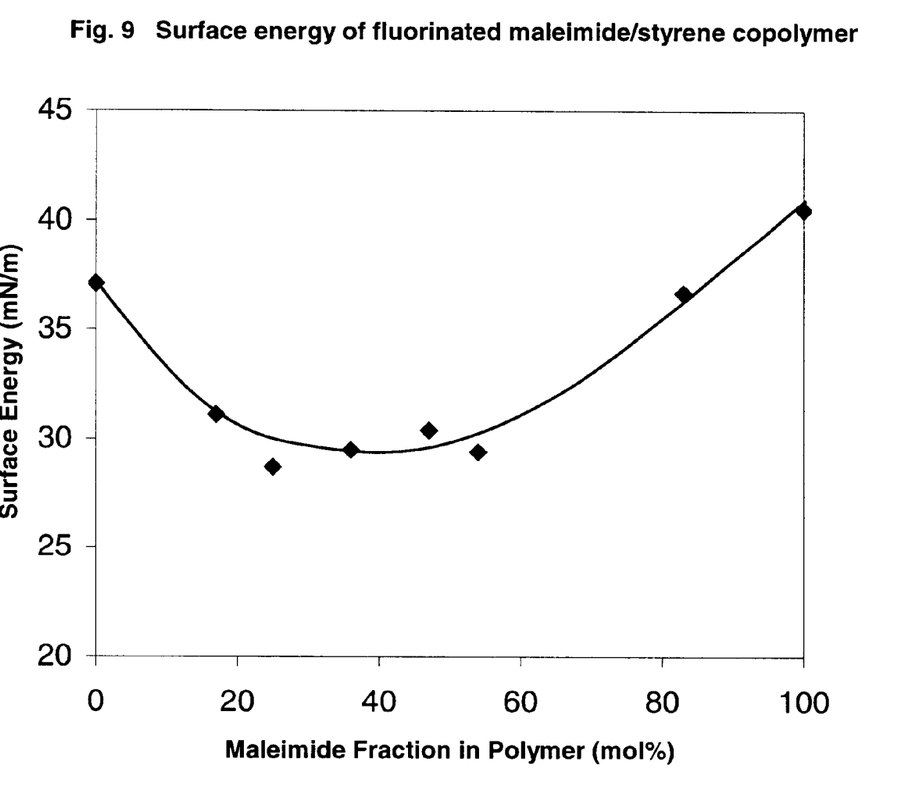
FIG. 9 is a graph of the surface energy of copolymers according to the invention.

The surface energy of fluorinated maleimide/styrene copolymer is shown in Table 7. The surface energy value was calculated by the Harmonic-Mean field theory based on the contact angle data of water, formamide and methylene iodide. The surface energy and copolymer composition dependence is plotted in FIG. 9. One of the interesting findings is that the copolymers have lower surface energies than that of both homopolymers. The minimal surface of copolymer has the composition nearly 1/1 in molar ratio. This indicates that there is a specific interaction between the fluorinated maleimide and styrene in the solid polymer state. It is known that the maleimide and vinyl ether monomer can form a 1:1 complex in solution for the electron acceptor/donor interaction, leading to formation of an alternative copolymer. Based on the solution polymerization results (Table 2), PFPMI and pentafluorostyrene tend to form an alternative copolymer. It is speculated that there is also some interaction between PFPMI and pentafluorostyrene. This kind of interaction is much smaller in polymer solid state but still exists. Compared with the homopolymer, the copolymer possesses smaller dipole moment (polarity) due to the electron acceptor/donor interaction. Therefore, the copolymer exhibits lower surface energy supported by the lower polarity from contact angle measurement (Table 7).

TABLE 7

The Surface Energy of Fluorinated Maleimide/Styrene Copolymer

| Example No.-Com. | Composition (PFMI mol %) | $\gamma_d$ | $\gamma_p$ | $\gamma$ | Polarity ($\chi^p$) |
|---|---|---|---|---|---|
| 1-(III) | 17 | 18.3 | 12.8 | 31.1 | 0.411 |
| 2-(III) | 36 | 20.1 | 9.4 | 29.5 | 0.319 |
| 3-(III) | 47 | 27.2 | 3.2 | 30.4 | 0.094 |
| 5-(III) | 25 | 23.4 | 5.3 | 28.7 | 0.185 |
| 6-(III) | 54 | 23.5 | 5.9 | 29.4 | 0.201 |
| 7-(III) | 83 | 20.4 | 16.3 | 36.7 | 0.444 |
| 13 | 100 | 20.7 | 17.8 | 40.5 | 0.440 |
| 14-(III) | 0 | 21.8 | 15.3 | 37.1 | 0.412 |

The molecular weight distribution of PFPMI and pentafluorostyrene (PFPMI/PFSt) copolymer in solution copolymerization followed close to an ideal radical mechanism with a polydispersity of about 2.0. The polydispersity increases in bulk copolymerization as the reaction progresses to diffusion control as more high glass transition maleimide unit is incorporated in the copolymer. The PFPMI/PFSt copolymer chain structure from $^{13}$C NMR spectra and copolymerization kinetics reveals an alternative like sequence distribution in solution copolymerization at 90° C. and a block sequence distribution in bulk polymerization at 140° C.

The copolymerization of PFPMI with 2-chloroethyl vinyl ether forms an ideal alternating copolymer. The glass transition temperature of maleimide copolymers is 80–150° C. higher than that of the corresponding homopolymerization of comonomer. Because of the relative high refractive index of PFPMI (RI=1.492 at 1300 nm), PFPMI can be also used to compensate for low refractive index comonomers in order to match the refractive index of the core of single mode glass optical fiber. An optical transmission loss of 0.2 dB/cm optical at 1550 nm was achieved in PFPMI/fluorinated acrylate copolymer with a refractive index of 1.43–1.44. A lower surface tension has been found in PFPMI/PFSt copolymers because of possible dipole-dipole interaction between the maleimide and comonomer unit in solid state. The low surface energy offers a potential advantage to fabricate polymer microstructure in contact microreplication processes.

The present invention provides N-halogenated maleimide copolymers that can be synthesized by radical copolymerization with a good control of molecular structure such as molecular weight distribution, copolymer composition, and copolymer sequence distribution. The maleimide containing copolymers exhibit a much improved thermal stability (Tg>150° C.), optical transparency (0.1–0.2 dB/cm at 1550 nm), a broad control of refractive index (1.40–1.52 at 1.55 μm), and microstructure fabrication process capability (both UV cure and thermal cure with low surface tension), and are useful in the manufacture of passive optical devices.

Any desired optical device such as those described in the "Background" section of the application can be fabricated from the copolymer by use of techniques well known in the art.

Although the invention has been described above in detail for the purpose of illustration, it is understood that numerous variations and alterations may be made by the skilled artisan without departing from the spirit and scope of the invention defined by the following claims.

What is claimed is:

1. A copolymer comprising a first monomer unit selected from a N-(halogenated phenyl) maleimide unit or a N-(halogenated biphenyl) bismaleimide unit and one or more second monomer units selected from the group consisting of halogenated acrylates, halogenated styrenes, halogenated vinyl amides, halogenated allyls, halogenated propenyl ethers, halogenated methacrylates, halogenated maleates, halogenated itaconates, and halogenated crotonates;

wherein said phenyl groups have substituents $R_1-R_5$ and at least one of $R_1-R_5$ is selected from the group consisting of $CF_3$, a $C_2-C_8$ perfluoroalkyl group and a perfluoroaryl group; and the remainder of said $R_1-R_5$ is selected from the group consisting of F, $CF_3$, a $C_2-C_8$ perfluoroalkyl group and a perfluoroaryl group; and wherein said N-(halogenated biphenyl) bismaleimide has the structure and each of said R groups therein is independently selected from the group consisting of F, $CF_3$, a $C_2-C_8$ perfluoroalkyl group and a perfluoroaryl group.

2. A copolymer as claimed in claim 1, wherein the second units comprise a halogenated acrylate.

3. A copolymer as claimed in claim 1, wherein the second units comprise a halogenated styrene.

4. A copolymer as claimed in claim 1, wherein the second units comprise a halogenated vinyl ether.

5. A copolymer as claimed in claim 1, wherein the second units comprise a fluorinated olefin.

6. The copolymer as claim in claim 1, wherein $R_1-R_5$ of the phenyl group in said N-(halogenated phenyl) maleimide is selected from the group consisting of $CF_3$, a $C_2-C_8$ perfluoroalkyl group and a perfluoroaryl group.

7. A copolymer as claim in claim 1, wherein the maleimide units are bismaleimide units, and wherein each of the R units of the therein is selected from the group consisting of $CF_3$, a $C_2-C_8$ perfluoroalkyl group and a perfluoroaryl group.

8. A copolymer as claimed in claim 1, wherein the second units comprise fluorinated units.

9. A copolymer as claimed in claim 1, wherein the second units comprise pentafluorostyrene; chloroethyl vinyl ether; 1H, 1H, 2H, 2H heptadecafluorodecyl acrylate; N-methyl, fluorinated sulfonamide vinyl ether; N-ethyl, fluorinated sulfonamide vinyl ether; or 1H, 1H, 2H heptadecafluoro decene-1 units.

10. A copolymer as claimed in claim 1, wherein the second units comprise units of the formula (II)

wherein, $X_1$ is $CH_3$, H, or $CF_3$; Rf is $C_2-C_{10}$ linear, branched, or cyclic perfluorocarbon or $CCl_3$, m is 0–2, and $X_2$ is H, F, Cl or Br.

11. A copolymer as claimed in claim 1, wherein the second units comprise units of the formula (IV)

(IV)

where, p=1 or 2, Rf1 is a $C_2$–$C_{10}$ linear, branched, or cyclic perfluorocarbon or a halogen, or has the following structure;

where $R_{11}$ is an alkyl group; and Rf2 is $C_2$–$C_{10}$ linear, branched, or cyclic perfluoroalkyl group.

12. An optical device comprising a copolymer as claimed in claim 1.

13. An optical device as claimed in claim 12, which has an optical loss of less than about 0.3 dB/cm at 1300 nm and 1550 nm.

14. An optical device as claimed in claim 12, which is a passive optical device.

15. An optical fiber waveguide formed from a copolymer as claimed in claim 1.

16. A method of preparing a copolymer as claimed in claim 1, comprising polymerizing N-(halogenated phenyl) maleimide or a N-(halogenated biphenyl) bismaleimide monomer with a monomer selected from one or more of the groups consisting of halogenated acrylates, halogenated styrenes, halogenated vinyl ether, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates, in the presence of ultraviolet or electron beams radiation.

17. A method as claimed in claim 16, which is a solution polymerization.

18. A method as claimed in claim 16, which is a bulk polymerization.

* * * * *